US007437326B2

(12) United States Patent
Slowik et al.

(10) Patent No.: US 7,437,326 B2
(45) Date of Patent: Oct. 14, 2008

(54) SECURITIES TRADING SIMULATION (75) Inventors: Donald Slowik, Witton, NH (US); Ani Chitaley, Ashland, MA (US); Vinod Pujar, Framingham, MA (US)

(73) Assignee: FMR Corp., Boston, MA (US)

( * ) Notice: Subject to any disclaimer, the term of this patent is extended or adjusted under 35 U.S.C. 154(b) by 355 days.

(21) Appl. No.: 10/453,142

(22) Filed: Jun. 2, 2003

(65) Prior Publication Data
US 2004/0243502 A1 Dec. 2, 2004

(51) Int. Cl.
G06Q 40/00 (2006.01)
(52) U.S. Cl. .......................... 705/37; 705/35; 705/36 R
(58) Field of Classification Search .................. 705/35, 705/36, 37, 36 R
See application file for complete search history.

(56) References Cited

U.S. PATENT DOCUMENTS

| | | | | | |
|---|---|---|---|---|---|
| 5,950,176 | A | * | 9/1999 | Keiser et al. | 705/37 |
| 6,061,662 | A | * | 5/2000 | Makivic | 705/36 R |
| 6,456,982 | B1 | * | 9/2002 | Pilipovic | 705/36 R |
| 2004/0064395 | A1 | * | 4/2004 | Mintz et al. | 705/37 |

OTHER PUBLICATIONS

Berg, Eric. "Chicago Board of Trade Challenges Rival Globex System". New York Times. New York, NY: Mar. 16, 1989. p. D2.*
Wexler, Sanford. "Hey! Are You Ready for Some Trading?". Traders Magazine. New York: Feb. 1, 2000. p. 1.*
Weber, Bruce W. "Next-Generation Trading in Futures Markets: A Comparison of Open Outcry and Order Matching Systems". Journal of Management Information Systems. fall 1999; 16, 2; ABI/INFORM Global p. 29.*
Berkowitz and Logue, Transaction Costs, The Journal of Portfolio Management, pp. 65-74, 2001.
Domowitz et al., Global Equity Trading Costs, pp. 1-14, May 8, 2001.
Harris, Liquidity and Transaction cost Measurement Liquidity and Transaction Cost Measurement, Chapter 21, 420-441, 2003.
Kissell and Gantz, Optimal Trading Strategies, Amacom, Chap. 13, pp. 337-370, 2003.
Lert, Methods of Measuring Transaction Costs, pp. 44-48, 2001.
Sofianos and Badcidore, Trading and Market Structure, Goldman Sachs Derivatives and Trading Research, pp. 1-15, Oct. 24, 2002.
Stoll, Equity Trading Costs In-The-Large, The Journal of Portfolio Management, pp. 41-50, 1993.
Wagner, Defining Best Execution, AIMR Conference Proceedings, pp. 13-24, May 2001.
International Search Report dated Jul. 7, 2005 for Application No. PCT/US04/17128, filed Jun. 2, 2004.

* cited by examiner

*Primary Examiner*—Lalita M. Hamilton
(74) *Attorney, Agent, or Firm*—Fish & Richardson P.C.

(57) ABSTRACT

A securities trading simulation method and system that is capable of performing a series of simulated securities trades of a security using actual or potential market data to obtain distribution of simulated trade prices of the security. The distribution of simulated trade prices may then be used in a number of ways, including to measure the quality of an actual trade, to estimate the opportunity available for a security, to estimate the fair value of a derivative security, or to otherwise characterize the volatility and momentum behavior of securities.

48 Claims, 2 Drawing Sheets

SECURITIES TRADING SIMULATION

TECHNICAL FIELD

This invention relates to securities trading, and more particularly to the provision and application of a securities trade simulator.

BACKGROUND

A securities trader receives orders to trade certain quantities of a security and, in response to these orders, the trader will buy or sell the security in one or more transactions made over the course of a certain time period. For example, a trader may receive an order to buy 50,000 shares of IBM stock that he or she may break up in 10 different transactions of varying amounts and varying prices over the course of a trading day. At the end of the trading day, the trader will have obtained 50,000 shares at a certain average price per share.

It is often useful to measure the quality of the price obtained by the trader for an order. Various tools are used in the securities trading industry to provide a measure of the performance of one or more executed orders. One way of measuring performance of an executed order is to compare the actual trade price with the volume weighted average (VWAP) of the security over the time period which the trader executed the order or over the course of the entire trading day the order was executed. The VWAP is computed most easily by dividing the total dollar value of all trades by the total trading volume in shares. Another way of measuring the performance of an executed order is to compare the actual trade price with the market price of the security when the trader received the order. This market price may be the price of the security in the transaction for the security that immediately preceded the time the order was received. Alternatively, the market price may be an average price of the security for a certain time period before the order was received, e.g., the average price for the five minute period before the order was received. Still other ways of evaluating the quality of a trade include comparing the trade price to an opening or closing price of the security for the day in question. While each of these techniques provide some measure of the performance of an executed order, they do not account for the effects on execution performance of market momentum and volatility that occurs during the trading period.

A securities trading simulator as described in more detail below simulates an executed trade and provides for another way to measure the quality of a trade. Such a trading simulator accounts for the effects of momentum and volatility, and, thus may provide a more realistic measure of trade quality. A securities trading simulator, however, is not limited to application as a benchmarking tool, but rather may also be used in a number of different ways. For example, a securities trading simulator may be used to predict opportunity and risk before a trade is made or used in the valuation of derivatives.

SUMMARY

In one aspect, the invention features a method of simulating a trade of a security at volume V over a time interval T that includes selecting a piece of market data from a pool of market data that reflects one or more actual or potential transactions of a volume of the security at a price during the time interval T, adding some or all of the volume reflected in the piece of selected market data to an accumulated volume not to exceed the volume V, and comparing the accumulated volume with the volume V. If the comparison reveals that the accumulated volume is less than the volume V, then the steps of selecting a piece of data and adding to the accumulated volume are repeated until the accumulated volume equals the volume V. Once the accumulated volume equals the volume V, a simulated trade price is recorded that represents the price of the accumulated volume.

Embodiments may include one or more of the following features. The method of simulating a trade of a security may further include repeating the steps of selecting a piece of market data, adding to the accumulated volume, comparing the accumulated volume with the volume V, and recording a simulated trade price until a stopping condition is met. The selection of pieces of market data may be randomly selected from the pool of data or selected by some other means, e.g., by a deterministic selection algorithm. If random selection is used, the random selection may be uniform (i.e., each piece of data in the pool has an equal chance of being selected) or through some weighting function which describes a relative probability of selecting a piece of market data.

The pool of market data may include individual quotes, individual ticks, or aggregated ticks or quotes. The time interval over which the simulation is run may span one trading day, a portion of a trading day, more than one trading day, or portions of multiple trading days. The security on which the simulation may be run is not limited to any particular type, and may be a stock, a bond, a derivative, commodity, or foreign exchange rate.

The method may select only a random fraction of the volume of each piece of selected market data. This random fraction may be between a minimum and/or maximum value (e.g., between 0 and 1). The minimum fractional value may be determined according to the ratio of the volume V of the simulated trade to the total volume available over the trading interval T. The method may include removing the selected piece of market data from the pool after each piece of market data is selected. The method may express the simulated trade price as the volume weighted average price per share of the accumulated volume or in some other way, such as the total price for the accumulated volume.

The method may also include forming a simulated trade price distribution using the predetermined number of simulated trade prices and performing various analytical computations on the simulated trade price distribution. For example, the method may compare an actual securities trade price to the simulated trade price distribution and determine a measure of performance of an actual securities trade in comparison to the simulated trade price distribution. The method may also calculate the opportunity of the simulated trade price distribution and/or generating a measure of the fair value of a derivative by integrating a payoff of a derivative against a simulated trade price distribution generated by a trading simulated.

In another aspect, the invention features a method of simulating a securities trade that includes (i) receiving input identifying a security on which to perform a simulated trade, a desired volume of the simulated trade, and a time period over which the simulated trade is to occur, (ii) creating a pool of pieces of market data, wherein each piece of market data includes information identifying the volume of the security represented by the piece of market data and information identifying the price of the piece of market data, (iii) selecting a piece of market data from the pool, (iv) recording an accumulated volume based on the information identifying the volume of the security represented by the selected piece of market data, wherein the recorded accumulated volume is not greater than the desired volume, (v) comparing the accumulated volume with the desired volume of the trade, and if the accumulated volume is less than the desired volume, and then repeating the steps of selecting a piece of data and recording an accumulated volume until the accumulated volume equals the desired volume. Once the accumulated volume equals the desired volume, then the method records a simulated trade price that is based on the information identifying the price at which the piece of market data was traded for each piece of randomly-selected market data.

Embodiments may include one or more of the following features. The method may repeat the steps of selecting a piece of market data, recording an accumulated volume, comparing the accumulated volume with the desired volume, and recording a simulated trade price until a predetermined condition has been satisfied (e.g., a predetermined number of simulated trade prices have been recorded).

The method may include forming a pool of pieces of market data from pieces of market data that reflect actual or potential transactions occurring between a first time and a second time and then continuously updating the pool of pieces of market data with pieces of market data that reflect actual or potential transactions occurring after the second time. The pieces of market data may be individual or aggregated ticks or quotes.

The selection technique used to select pieces of data may be random or deterministic. The volume of each selected piece of market data recorded in the accumulated volume may be the entire volume of each selected piece of market data or a fraction thereof. The fractional volume of each piece of market data recorded in the accumulated volume may be a random fraction that may be between a minimum and/or maximum amount (e.g., between 0 and 1).

The method may remove each selected piece of market data from the pool after it is selected. The method may further determine, after each piece of market data is removed from the pool, whether the pool of market data contains any pieces of market data. If the pool of market data does not contain any pieces of market data, then the method may return all removed pieces of market data to the pool, set the accumulated volume to zero, and repeat the steps of selecting a piece of market data, recording an accumulated volume, comparing the accumulated volume with the desired volume, and recording a simulated trade price until a predetermined condition has been satisfied.

The method may include accessing one or more databases containing ticks that represent actual transactions of a plurality of security, identifying the ticks that represent actual transactions of the identified security, and forming a pool of pieces of market data from the identified ticks. The method may include filtering out ticks that represent a transaction above and/or below a predetermined threshold value or aggregating the ticks that were recorded during a time interval.

In another aspect, the invention features a method for simulating securities transactions that includes performing a plurality of simulated securities trades of security S at a volume V using recorded market data that reflects a plurality of actual trades involving security S to obtain a predetermined number of simulated prices of security S at volume V; and forming a simulated trade price distribution using the simulated prices of security S at volume V.

Embodiments may include one or more of the following features. The method may further include comparing the simulated trade price distribution to an actual trade price of security S and generating a measure of the actual trade price in comparison with the simulated trade price distribution. The measure of the actual trade price in comparison with the simulated trade price distribution may, for example, be the probability that a simulated trade would obtain a better price than the actual trade or the cost of trade that reflects the relationship between the mean price of the simulated trade price distribution and the actual price.

The method may further include examining a width of the simulated trade price distribution to determine an estimated opportunity available for a proposed trade. The width of the simulated trade price distribution may be the entire width of the distribution or some lesser portion of it (e.g., the standard deviation). The method may further include estimating the fair value of a derivative security that depends on the trade price of the underlying security.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
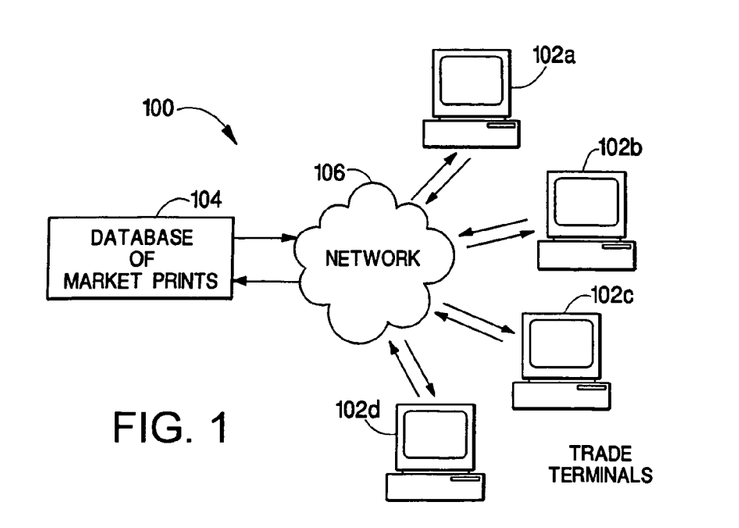
FIG. 1 is an illustration of a networked computer system on which a securities trading simulator is run.

As shown in FIG. 1, a networked computer system 100 includes several trader terminals 102a-102d that communicate with a database 104 over network 106. Database 104 includes a market print (or "tick") for each securities trade that has been made on one or more trading markets. Each tick will include information about the trade, including the identity of the security traded, the volume of the trade, the price for the trade, and the time which the security was traded. For example, if the New York Stock Exchange facilitates a trade of 5,000 shares of IBM stock at a price of $100 per share, a tick will be recorded on database 104 that includes this information. On each terminal 102a-102d resides a securities trading simulator (not shown) that simulates trades of various securities, e.g., stocks, bonds, commodities, derivatives, using these ticks recorded in database 104.

Figure 2:
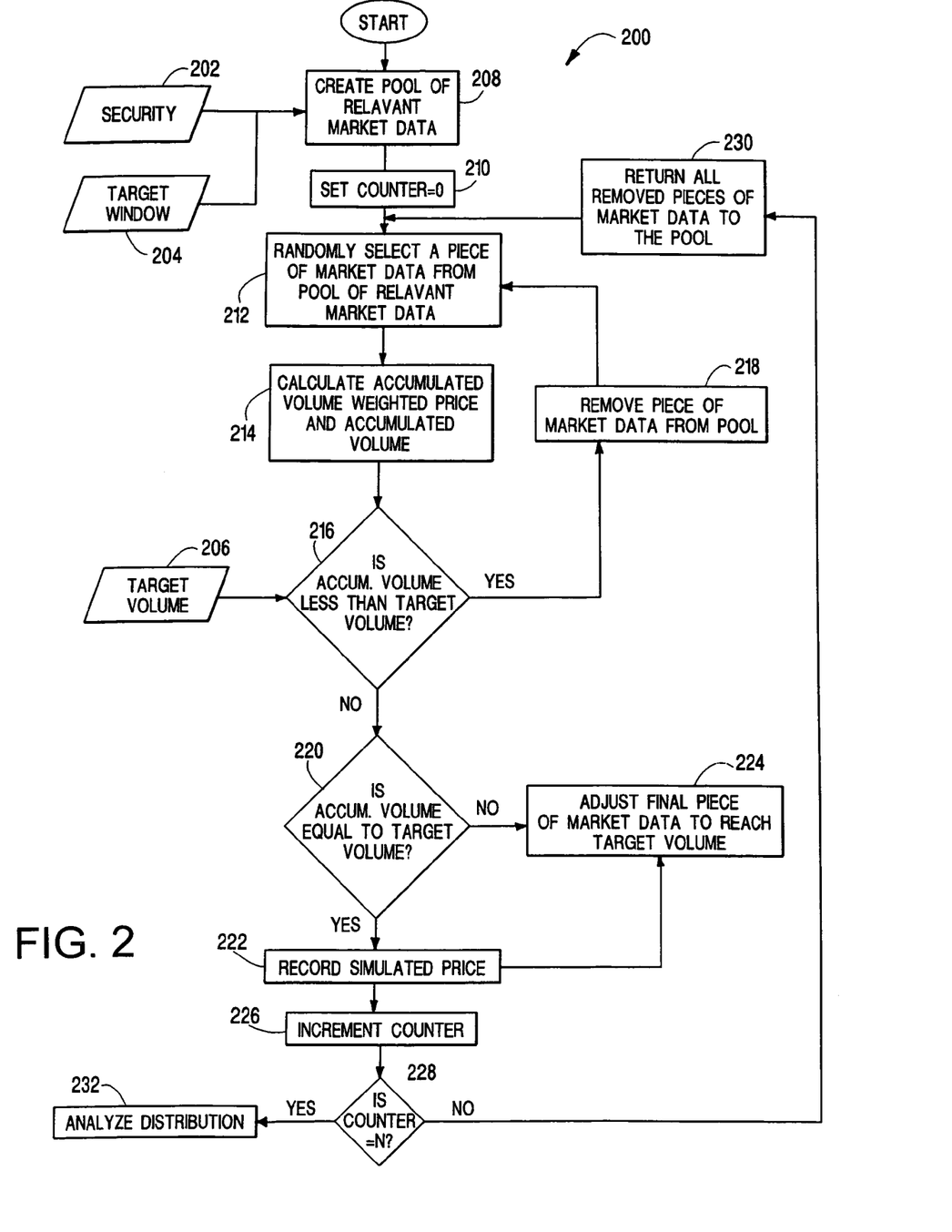
FIG. 2 is a flow chart illustrating the operation of a securities trading simulator.

As shown in FIG. 2, a securities trading simulator 200 receives three inputs from a trader:

(1) the identity of the security on which the simulation should be run (block 202);

(2) the desired trading window, which is the time interval over which the simulation should be run (block 204); and (3) the volume of the security on which the simulation should be run (block 206);

Once the simulator 200 receives this input, it creates a pool of market data that the simulator will use in its trade simulations (block 208). The pool of market data is created from the ticks contained in the trading database 104 (shown in FIG. 1). In one embodiment, the pool of market data is simply a collection of all of the ticks recorded for the target security over the desired trading window that are contained in the trading database. In another embodiment, the pool of market data is a collection of fixed-time interval "price bins," which each represent a volume weighted average price of ticks over a fixed time interval. For example, if a time interval is defined as three minutes, then a price bin may be the volume weighted average of the ticks that were traded during a three-minute window. If the trading horizon interval is an entire trading day, e.g., 9:30 am through 4:00 pm, and the bin interval was defined as 3-minutes, then there would be a total of 130 possible bins over the course of the trading horizon (i.e., 130 bins 6.5 hrs×60 min/hr.÷3 min.).

After creating the pool of market data, the simulator 200 resets a counter to zero (block 210) and randomly selects a piece of market data (e.g., a price bin) from the pool of relevant market data (block 212). The simulator may use any random selection technique to select the piece of market data. For example, the simulator may randomly select a piece of market data from the entire pool of market data with uniform probability (i.e., each piece of market data in the pool has the same chance of being selected) or through some weighting function (e.g., a exponentially decaying function) which describes a relative probability of selecting a piece of market data. The simulator may also be configured to examine pieces of market data in the pool sequentially (e.g., chronologically, reverse chronologically, by increasing/decreasing volume or price) and randomly select each examined piece using a "coin-flip" algorithm. It should be understood that the securities trading simulator described herein should not be limited to any particular selection technique.

After randomly selecting a piece of market data (block 212), the simulator 200 calculates the accumulated volume weighted price and accumulated volume (block 214). In the first run through the inner loop of the simulator (i.e., blocks 212, 214, 216, 218, 220), the accumulated volume weighted price is simply the volume weighted price of the randomly selected piece of market data and the accumulated volume is the volume of the randomly selected piece of market data. As the simulator cycles through the inner loop, the accumulated volume weighted average price is the volume weighted average price of all of the randomly selected pieces of market data and the accumulated volume is simply the sum of the volume of all of the pieces of market data. For example, if the simulator cycles through the inner loop three times and randomly selects three price bins, one of 1,000 shares at a volume weighted price of $100, a second of 100 shares with a volume weighted price of $101, and a third of 10,000 shares at a volume weighted price of $97, the accumulated volume is simply 11,100 shares (i.e., 1,000+100+10,000 shares). The accumulated volume weighted average price is $97.31 per share (i.e., [1,000*$100+100*$101+10,000*$97]/11,100). In another embodiment, a simulator may calculate the volume weighted average price of all accumulated shares just prior to recording a simulated price rather than continually updating the volume weighted average price as shown in block 214 of FIG. 2. It should also be noted that a securities simulator need not express the simulated price in terms of the volume weighted average price of the accumulated shares, but may also express the simulated price in terms of the total price paid for all of the accumulated shares.

After the simulator calculates the accumulated volume weighted average price (block 214), it checks to see if the accumulated volume is less than the target volume (block 216). If it is, then the last piece of market data that was randomly selected is removed from the pool of relevant market data (block 218), another piece of market data is selected from the pool (block 212), the accumulated volume weighted average price and accumulated volume are calculated (block 214), and the accumulated volume is again checked to see if it is less than the target volume.

Once the accumulated volume is not less than the target volume, the simulator checks to see if the accumulated volume is equal to the target volume (block 220). If it is, then the accumulated volume weighted average price is recorded as a simulated price (block 222). If the accumulated volume is not equal to the target volume, then the accumulated volume is greater than the target volume and the simulator only takes the volume needed from the last piece of market data to equal the target volume (block 224). For example, suppose the target volume is 30,000 shares and the accumulated volume is 28,000 shares. If the next piece of market data is for 10,000 shares, the simulator will only take 2,000 of the 10,000 shares and will adjust the accumulated volume weighted average price accordingly. After the final piece of market data and accumulated volume weighted average price is adjusted to equal the target volume, the accumulated volume weighted average price is recorded as a simulated price (block 222).

After a simulated price is recorded, the simulator 200 increments a counter (block 226) and checks to see if the counter has reached a predetermined number N. The number N may be selected by the user running the simulator or it may be preprogrammed. In any case, the number N should be large enough (e.g., 1000) to produce a statistically meaningful set of simulated prices. If the simulator has not recorded N simulated prices, then all of the removed pieces of market data are returned to the pool of relevant market data (block 230) and another simulated price is obtained. Once the simulator has obtained N number of simulated prices, it then analyzes the distribution of simulated prices (block 232).

In another embodiment, a securities trading simulator may not obtain a predetermined number of simulated trade prices, but may generate simulated trade prices until some other stopping condition is met, such as a condition that halts trade price simulations when the simulator determines that additional simulated trade prices are only marginally affecting the shape of the trade price distribution. This may be accomplished, for example, by calculating some statistical measure (e.g., mean, median, standard deviation, variance, and the like) after each simulated trade price, and then causing the simulator to stop its simulation when the statistical measure fails to change by a certain amount over a number of simulated prices. For example, a simulator may record 1,000 simulated trade prices and for each simulated trade price thereafter, it may measure the standard deviation of the simulated trade price distribution. Once a certain number (e.g., 10) consecutive simulated trade prices fail to change the standard deviation by more than a certain amount (e.g., 1%), the simulation stops.

In the embodiment illustrated in FIG. 2, the trading simulator 200 used the whole volume of each piece of randomly selected market data during each trade simulation (except for the last piece of randomly selected piece of market data, which was adjusted to reach the target volume). However, a single trader typically does not buy or sell the full volume of shares represented in a tick or collection of ticks, and therefore, a simulator may be configured to only take a fraction of the volume of each randomly selected piece of market data. For example, if a simulator randomly selects a price bin of 1,000 shares at $100/share from a pool of bins, the simulator may only take a random fraction, e.g., 25% of the shares, from this bin in performing its price simulation. The fraction taken of the price bin need not be randomly selected, but in other embodiments, may be a fixed fraction or a known variable.

While selecting a random fraction of the selected pieces of market data may provide for a more realistic simulator, the trading simulator may run out of pieces of market data from the pool of relevant market data because, on average, the simulator will only be taking 50% of each piece of market data. If the simulator runs out of market data when performing a simulated trade, it is not able to record a simulated trade price, but rather must return all of the market data back into the pool and start the simulation over. In order to reduce the probability that the simulator will run out of market data during a simulated trade, a simulator may be configured to ensure that the trading simulator takes at least a minimum fraction of the volume of the randomly selected piece of market data. In one embodiment, the minimum fraction may be set according to the ratio of the volume of the simulated trade to the total volume available over the simulated trading window. For example, suppose a trading simulation window is set to perform a simulation of 60,000 shares of IBM stock over a 2 hour period on a particular day, and, during that 2 hours trading window, a total of 100,000 shares of IBM stock was traded. In this case, the ratio the simulated traded volume to the total volume is 60%. The simulator may be configured to take a random fraction of between 20%-100% of each piece of market data. By constraining the random fraction between 20 and 100 percent, the trading simulator will, on average, take 60% of the total volume before running out of market data in the pool. The minimum trading fraction need not be set according to the ratio of the volume of the simulated trade to the total volume available over the simulated trading window, but may be fixed or user-selected.

In another embodiment a securities trading simulator may be configured to draw pieces of market data from the pool, not randomly, but according to a deterministic selection algorithm. For example, a deterministic algorithm could be one that attempts to model momentum and emotion by examining upward or downward trends in the market and selecting pieces of market data based on these trends. For example, a simulator could be configured to examine the pieces of market data in the pool of data starting from the beginning of the time window and would select a piece of market data if five consecutive pieces of market data show an increasing (or decreasing) volume weighted average price. Another way to configured the simulator is to select a piece of market data by examining every tenth piece of market data starting from the beginning of the time window and selecting a piece of market data if two consecutive pieces of examined market data show an increase (or decrease) in the volume weighted average price of more than a certain amount (e.g., 1%). It should be understood that many other deterministic selection techniques could be used in a securities trading simulator without departing from the inventive aspects of the various embodiments described herein.

A securities trading simulator, such as the simulator illustrated in FIGS. 1 and 2, may be used in a wide variety of applications.

In one application, a securities trading simulator is used as a trade quality measurement tool which measures the quality of the price obtained by a trader in a transaction. In this application, a securities trading simulator is provided with the name of the security, the traded volume, and the desired trading window. The desired trading window may be the time the order was placed by the customer until the end of the trading day. The simulator then runs a series of trade simulations to produce a simulated price distribution. From this distribution, the performance of the actual trade may be measured in a variety of ways.

To illustrate this application, suppose a trader received an order to sell 50,000 shares of IBM at 10:00 am on a particular day. Throughout the course of the trading day, the trader sold all 50,000 shares at a volume weighted average price of $112 per share. The simulator may be run to simulate a large number, e.g., 1000, of sales of 50,000 shares of IBM stock to produce the price distribution shown in FIG. 3. The price actually obtained by the trader may be compared with the results of the simulator in a number of ways to measure the performance of the trade.

One way to measure the performance of the trade is to examine the "cost" of the trade by using the mean price yielded from the simulation (e.g., $110.25 in FIG. 3) as a benchmark price and comparing it to the actual price. The cost of the trade may be expressed as a the cost per share traded, which is simply the difference between the actual price and the mean price of the simulated distribution. Thus, in this example, the cost per share is $112−$110 or +$2. The cost of the trade may also be expressed as a ratio of the cost per share to the price paid or to the benchmark price, e.g., +2/112 or +2/110. These ratios may be converted into basis points (by multiplying by 10,000) and expressed in basis points, e.g., +179 bps, +182 bps.

The cost of a trade may also be expressed as a ratio relative to the width of the simulated trade price distribution. A measure of the width of the simulated distribution may be the entire width of the distribution (e.g., $8 in FIG. 3), the standard deviation, a multiple of the standard deviation, or it may be some other fraction of the entire width. For example, one may choose to measure the width of the distribution as the difference in price between a point on the simulated price distribution where 20% of the simulated trades have a lower price, and a point where 80% of the trades have a lower price. In this example, the width would be $4. If the width is defined as the entire width of the distribution, the cost as a fraction of this width is $2/$8=0.25. If the width is defined as the difference in price between the point where 20% of the simulated trades have a lower price and 80% of the trades have a lower price, then the cost as a fraction of this width is 0.5. There are, of course, any number of ways one may choose to define the width of the distribution.

Figure 3:
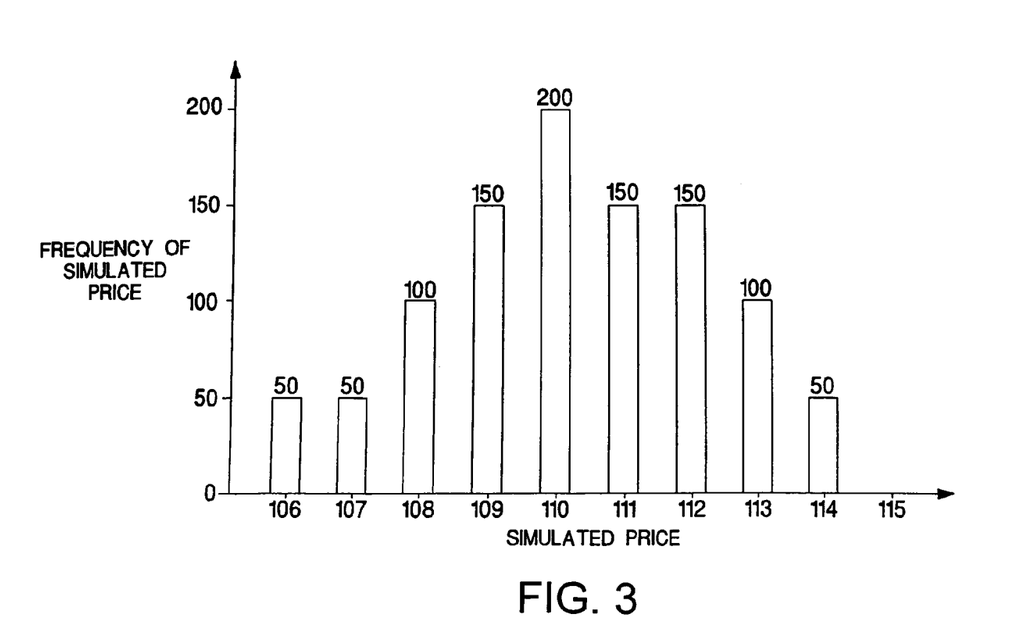
FIG. 3 is a histogram illustrating the distribution of a number of simulated prices.

The opportunity is defined as the half-width of the price distribution curve. Thus, following this example, if the width is measured as the entire width of the price distribution curve, the opportunity would be $4. If the width is measured as the difference between the points were 20% and 80% of the trades have lower prices, the opportunity would be $2. Another way to measure the performance is to calculate the opportunity ratio of the trade, which is the ratio of cost per share to the opportunity available for the trade. In this case, the cost of the actual trade ($112) relative to the mean ($110) is $2. This $2 relative price can then be normalized by the opportunity ($4 using the entire width measurement) to yield an opportunity ratio of 0.5 or 50%. In this case, the opportunity ratio shows that the trader achieved a sales price that was half-way between the mean and the best price achieved by the simulator. There are, of course, many other ways in which the results of the simulator may be used to measure trade quality performance using various statistical analysis that are known in the art.

Another way to measure performance is to calculate the probability the simulator would out-perform the actual trader. In this example, the simulator only out-performed the trader 150 times out of the 1000 simulation runs, thus the probability the simulator would out-perform the actual trader is 0.15 or 15%.

A securities trading simulator may also be used to assist a trader before he or she makes a trade by providing simulated trade results using recent market data (e.g., the market data recorded over the previous hour of trading). For example, using recent market data, the trader is able to see the mean price and current opportunity available (i.e., the half-width of the distribution curve) for a security the trader is about to trade. By examining the opportunity available for the security, the trader is able to see how much above and below the mean price he or she would expect to pay for the trade, and thus the opportunity/risk involved in the trade.

A securities simulator may be used to simulate trading of a security over several days, weeks, or months, to provide a historical perspective of the security. For example, a trader may calculate the width of a simulated price distribution curve for trading 20% of the volume of IBM for each day over a period of a week, and use the results to predict future widths or opportunities on similar future trades.

In another application, a securities simulator may be used to estimate the fair value of a trade of a derivative security, e.g., an option or a future, that depends on the underlying trade price. For example, a call option has a payoff of 0 if the actual trade price, T, is less than or equal to a strike price, X, and a payoff of T−X if T is greater than X. Thus, the option provides insurance for a trader against paying more than a price of X to acquire a security. A trader can estimate the fair value of the option by calculating the following integral of the payoff (i.e., T−X) against a simulated trade price distribution (i.e., P(T)) generated by a trading simulator:

$$E[\text{payoff}] = \int_X^{inf} (T-X)P(T)dT.$$

A number of embodiments of the invention have been described. Nevertheless, it will be understood that various modifications may be made without departing from the spirit and scope of the invention. For example, a securities trading simulator may be applied to obtain a trade price distribution for a collection of simulated trades of one or more securities. Additionally, a securities trading simulator may be configured to simulate trades of one or more securities over various trading windows. For example, a securities trading simulator may be configured to simulate a purchase of 10,000 shares of IBM stock between 9:30 am and 3:00 pm and a purchase of 90,000 shares of IBM between 3:00 pm and 4:00 pm. A securities simulator may also filter the ticks when it creates a pool of market data in which to run a simulation by, for example, filtering out ticks that are below or above a threshold volume. A securities trading simulator may create the pool of market data using data from one or more trading days. Similarly, a securities trading simulator may also be configured to update the pool of market data in real time by adding ticks or other pieces of market data to the pool as they are recorded. A securities trading simulator is not limited to simulation of stock trades, but may also be applied to simulating trading of bonds, derivatives, and commodities. Additionally a securities trading simulator may perform simulated trades, not only using recorded actual transaction (e.g., ticks), but may perform simulated trades using pieces of market data that represent potential transactions (e.g., a quote to buy or sell a volume of a security at a certain price). Accordingly, other embodiments are within the scope of the following claims.

What is claimed is:

1. A method of simulating a trade of a security at volume V over a time interval T, the method comprising:
   selecting a piece of market data from a pool of market data, wherein each piece of market data in the pool reflects one or more actual or potential transactions of a volume of the security at a price during the time interval T;
   adding, using a computing system, some or all of the volume reflected in the piece of selected market data to an accumulated volume not to exceed the volume V;
   comparing, using the computing system, the accumulated volume with the volume V, and if the accumulated volume is less than the volume V, then repeating the steps of selecting a piece of data and adding, using the computing system, to the accumulated volume until the accumulated volume equals the volume V; and
   once the accumulated volume equals the volume V, calculating a simulated trade price that represents the price of the accumulated volume.

2. The method of claim 1 further comprising:
   repeating the steps of selecting a piece of market data, adding, using the computing system, to the accumulated volume, comparing, using the computing system, the accumulated volume with the volume V, and calculating a simulated trade price until a stopping condition is met.

3. The method of claim 2 wherein the stopping condition is met when a predetermined number of simulated trade prices have been calculated.

4. The method of claim 2 wherein selecting, using the computing system, a piece of market data from a pool of market data comprises randomly selecting a piece of market data from a pool of market data.

5. The method of claim 4 wherein randomly selecting a piece of market data from a pool of market data comprises randomly selecting a piece of market data from a pool such that each piece of market data has the same probability of being selected.

6. The method of claim 2 further comprising:
   forming an estimated trade price distribution using the predetermined number of simulated trade prices.

7. The method of claim 6 further comprising:
   comparing an actual securities trade price to the estimated trade price distribution; and
   determining a measure of performance of an actual securities trade in comparison to the estimated trade price distribution.

8. The method of claim 7 wherein the measure of performance is the probability that a simulated trade price on the estimated trade price distribution would be greater than the actual securities trade price.

9. The method of claim 6 further comprising:
   determining the opportunity of the estimated trade price distribution.

10. The method of claim 6 further comprising:
    integrating a payoff of a derivative against a estimated trade price distribution generated by a trading simulator; and
    generating a measure of the fair value of a derivative.

11. The method of claim 1 wherein each piece of market data in the pool of pieces is a quote.

12. The method of claim 1 wherein each piece of market data in the pool of pieces of market data is a tick.

13. The method of claim 1 wherein each piece of market data in the pool represents an aggregate of ticks recorded during a fixed-time interval.

14. The method of claim 1 wherein the time interval T spans more than one trading day.

15. The method of claim 1 wherein the security comprises one of the following: a stock, a bond, a derivative, commodity or foreign exchange rates.

16. The method of claim 1 wherein adding some or all of the volume reflected in the piece of selected market data to an accumulated volume comprises:
    randomly selecting, using the computing system, a fractional value F; and
    adding fractional value F, using the computing system, of the volume reflected in the piece of selected market data to an accumulated volume.

17. The method of claim 16 wherein the fractional value F is between 0 and 1.

18. The method of claim 16 wherein the fractional value F is no less than a minimum fractional value.

19. The method of claim 18 wherein the minimum fractional value is dependent on ratio of the volume V of the simulated trade to the total volume available over the trading interval T.

20. The method of claim 1 further comprising:
after selecting a piece of market data from the pool of market data, removing the selected piece of market data from the pool.

21. The method of claim 20 further comprising:
after each piece of market data is removed from the pool, determining whether the pool of market data contains any pieces of market data, and if the pool of market data does not contain any pieces of market data, then performing the steps of:
returning all removed pieces of market data to the pool;
setting the accumulated volume to zero; and
repeating the steps of selecting a piece of market data, adding, using the computing system, to the accumulated volume, comparing, using the computing system, the accumulated volume with the desired volume, and calculating a simulated trade price until a predetermined number of simulated trade prices have been recorded.

22. The method of claim 1 further comprising:
after each piece of market data is selected, computing, using the computing system, an accumulated volume weighted average price based on the accumulated volume and the price reflected in each piece of randomly selected market data.

23. The method of claim 1 wherein the simulated trade price is expressed as the volume weighted average price per share of the accumulated volume.

24. The method of claim 1 wherein the simulated price is expressed as the total price for the accumulated volume.

25. The method of claim 1 wherein adding some or all of the volume reflected in the piece of selected market data to an accumulated volume not to exceed the volume V comprises:
selecting some or all of the volume reflected in the piece of randomly selected market data;
determining, using the computing system, if the accumulated volume with the selected volume would exceed the volume V and if so, then reducing the amount of selected volume to an amount that would cause the accumulated volume to equal the volume V.

26. A method of simulating a securities trade, the method comprising:
receiving input identifying a security on which to perform a simulated trade, a desired volume of the simulated trade, and a time period over which the simulated trade is to occur;
creating a pool of pieces of market data, wherein each piece of market data includes information identifying the volume of the security represented by the piece of market data and information identifying the price of the piece of market data;
selecting a piece of market data from the pool;
recording, using a computing system, an accumulated volume based on the information identifying the volume of the security represented by the selected piece of market data, wherein the recorded accumulated volume is not greater than the desired volume;
comparing, using the computing system, the accumulated volume with the desired volume of the trade, and if the accumulated volume is less than the desired volume, then repeating the steps of selecting a piece of data and recording an accumulated volume until the accumulated volume equals the desired volume, once the accumulated volume equals the desired volume, calculating a simulated trade price that is based on the information identifying the price at which the piece of market data was traded for each piece of randomly-selected market data.

27. The method of claim 26 further comprising:
repeating the steps of selecting a piece of market data, recording, using the computing system, an accumulated volume, comparing, using the computing system, the accumulated volume with the desired volume, and calculating a simulated trade price until a predetermined condition has been satisfied.

28. The method of claim 26 wherein creating a pool of pieces of market data comprises:
forming a pool of pieces of market data from pieces of market data that reflect actual or potential transactions occurring between a first time and a second time;
continuously updating the pool of pieces of market data with pieces of market data that reflect actual or potential transactions occurring after the second time.

29. The method of claim 26 wherein selecting a piece of market data from the pool comprises randomly selecting, using the computing system, a piece of market data from the pool.

30. The method of claim 26 wherein the predetermined condition is a predetermined number of simulated trades.

31. The method of claim 26 wherein each piece of market data in the pool represents an aggregate of ticks recorded during a fixed-time interval.

32. The method of claim 26 wherein recording an accumulated volume based on the information identifying the volume of the security represented by the selected piece of market data comprises:
adding, using the computing system, a random portion of volume of the security represented by each selected piece of market data to the accumulated volume; and
after adding a random portion of the volume to the accumulated volume, determining, using the computing system, if the accumulated volume is greater than the desired volume, and if so, then reducing the random portion of the volume to an amount that causes the accumulated volume to equal the desired volume.

33. The method of claim 32 wherein the random portion is between 0 and 1.

34. The method of claim 32 wherein the random portion is no less than a minimum fractional value.

35. The method of claim 26 further comprising:
after selecting a piece of market data from the pool of market data, removing the selected piece of market data from the pool.

36. The method of claim 35 further comprising:
after each piece of market data is removed from the pool, determining whether the pool of market data contains any pieces of market data, and if the pool of market data does not contain any pieces of market data, then performing the steps of:
returning all removed pieces of market data to the pool;
setting the accumulated volume to zero; and
repeating the steps of selecting a piece of market data, recording, using the computing system, an accumulated volume, comparing, using the computing system, the accumulated volume with the desired volume, and calculating a simulated trade price until a predetermined condition has been satisfied.

37. The method of claim 26 wherein the simulated price is expressed as the volume weighted average per share of the accumulated volume.

38. The method of claim 26 wherein creating a pool of pieces of market data comprises:
   accessing one or more databases containing ticks that represent actual transactions of a plurality of security;
   identifying the ticks that represent actual transactions of the identified security;
   forming a pool of pieces of market data from the identified ticks.

39. The method of claim 38 wherein forming a pool of pieces of market data from the identified ticks comprises:
   filtering out ticks that represent a transaction below a predetermined threshold value.

40. The method of claim 38 wherein forming a pool of pieces of market data from the identified ticks comprises:
   filtering out ticks that represent a transaction above a predetermined threshold value.

41. The method of claim 38 wherein forming a pool of pieces of market data from the identified ticks comprises:
   dividing the time interval over which the simulated trade is to occur into a series of bins, each bin representing a fixed period of time within the time interval; and
   aggregating, using the computing system, the ticks that occurred within the time period of each bin.

42. A computer program product residing on a computer readable medium for simulating a trade of a security at volume V over a time interval T comprises instructions to cause a computer to:
   select a piece of market data from a pool of market data, wherein each piece of market data in the pool reflects one or more actual transactions of a volume of the security at a price during the time interval T;
   add some or all of the volume reflected in the piece of randomly selected market data to an accumulated volume not to exceed the volume V;
   compare the accumulated volume with the volume V of the trade, and if the accumulated volume is less than the volume V, then repeating the steps of selecting a piece of data and adding to the accumulated volume until the accumulated volume equals the desired volume; and
   once the accumulated volume equals the desired volume, calculate a simulated trade price that represents the price of the accumulated volume.

43. The computer program product of claim 42 further comprises instructions to cause a computer to:
   repeat the steps of selecting a piece of market data, adding to the accumulated volume, comparing the accumulated volume with the desired volume, and calculating a simulated trade price until a predetermined condition has been met.

44. The computer program product of claim 43 wherein the predetermined condition occurs once a predetermined number of simulated trade prices have been calculated.

45. The computer program product of claim 42 further comprising instructions to:
   randomly select a fractional value F; and
   add fractional value F of the volume reflected in the piece of randomly selected market data to an accumulated volume.

46. The computer program product of claim 42 further comprising instruction to:
   form an estimated trade price distribution using a plurality of the calculated simulated trade prices.

47. The computer program product of claim 46 further comprising instructions to:
   compare an actual securities trade price to the estimated trade price distribution; and
   determine a measure of performance of an actual securities trade in comparison to the estimated trade price distribution.

48. The computer program product of claim 47 further comprising instructions to:
   determine the opportunity of the estimated trade price distribution.

* * * * *

UNITED STATES PATENT AND TRADEMARK OFFICE
CERTIFICATE OF CORRECTION

PATENT NO. : 7,437,326 B2
APPLICATION NO. : 10/453142
DATED : October 14, 2008
INVENTOR(S) : Donald Slowik, Ani Chitaley and Vinod Pujar

It is certified that error appears in the above-identified patent and that said Letters Patent is hereby corrected as shown below:

Title Pg, Item (75), "INVENTORS", delete "Witton, NH" and insert -- Wilton, NH --.

In Claim 25, at column 11, line 41, delete "V" and insert -- V, --.

Signed and Sealed this

Sixth Day of January, 2009

JON W. DUDAS
*Director of the United States Patent and Trademark Office*